(12) United States Patent
Abe et al.

(10) Patent No.: US 7,903,320 B2
(45) Date of Patent: Mar. 8, 2011

(54) ELECTROPHORETIC DISPLAY DEVICE AND ELECTRONIC APPARATUS

(75) Inventors: Hiroyuki Abe, Matsumoto (JP); Takeshi Koshihara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/482,632

(22) Filed: Jun. 11, 2009

(65) Prior Publication Data
US 2010/0007941 A1  Jan. 14, 2010

(30) Foreign Application Priority Data
Jul. 14, 2008  (JP) ................................ 2008-182816

(51) Int. Cl.
*G02B 26/00* (2006.01)
(52) U.S. Cl. ........................................ 359/296
(58) Field of Classification Search ................. 359/296; 430/32, 34, 38; 345/107, 105, 84
See application file for complete search history.

(56) References Cited

U.S. PATENT DOCUMENTS

| 6,987,503 B2 * | 1/2006 | Inoue | 345/107 |
| 7,307,780 B2 * | 12/2007 | Kanbe | 359/296 |
| 7,436,465 B2 * | 10/2008 | Moriya et al. | 349/48 |

FOREIGN PATENT DOCUMENTS

| JP | 2003-84314 A | 3/2003 |
| JP | 2008-249792 A | 10/2008 |

\* cited by examiner

*Primary Examiner* — Ricky L Mack
*Assistant Examiner* — Tuyen Q Tra
(74) *Attorney, Agent, or Firm* — AdvantEdge Law Group, LLC

(57) ABSTRACT

An electrophoretic display device includes a first substrate on which a pixel electrode and another pixel electrode that is adjacent to the pixel electrode are formed, a second substrate on which a common electrode facing the pixel electrode and the another pixel electrode that is adjacent to the pixel electrode is formed, a plurality of electrophoretic elements that is sandwiched by the first substrate and the second substrate and has charged electrophoretic particles, and an adhesive agent layer that is disposed between the plurality of electrophoretic elements and the first substrate. A floating electrode that is electrically isolated is disposed between the pixel electrode and the another pixel electrode that is adjacent to the pixel electrode on the first substrate.

8 Claims, 6 Drawing Sheets

ELECTROPHORETIC DISPLAY DEVICE AND ELECTRONIC APPARATUS

BACKGROUND

1. Technical Field

The present invention relates to an electrophoretic display device and an electronic apparatus.

2. Related Art

As one type of display devices, there are electrophoretic display devices that perform display by migrating charged particles (electrophoretic particles) that are dispersed in a dispersion medium in accordance with an electric field that is generated between electrodes and controlling the distribution state of the charged particles. Generally, the above-described electrophoretic display devices have structural advantages that the electrophoretic display devices do not need a light source such as a front light due to high reflectivity of the electrophoretic particles and can be formed to be thin and quality advantages that the viewing angle is wide and the contrast is high. In addition, since any back light is not needed, the electrophoretic display devices have an advantage that low power consumption can be implemented, as well. The electrophoretic display devices have attracted attention as next-generation display devices having the above-described devices, and development thereof has been progressed.

For example, in JP-A-2003-84314, an electric potential difference between a pixel electrode and an opposing electrode is generated by storing an image signal in a memory circuit (latch circuit) at once and inputting the image signal stored in the memory circuit to the pixel electrode, and whereby an electrophoretic element is driven. By performing the above-described driving operation, a display image can be maintained based on the image signal that is stored in the latch circuit. In addition, power is not consumed for maintaining an image that is displayed once, and accordingly, lower power consumption is implemented.

However, in the electrophoretic display device, an adhesive agent is used for fixing the electrophoretic elements between the electrodes. The adhesive agent layer formed by using the adhesive agent sometimes includes impurities such as additives for accelerating hardening of the adhesive agent or resolvents thereof. Thus, the adhesive agent layer may sometimes have weak conductivity due to the impurities.

In addition, in order to display an image in the electrophoretic display device, an electric potential difference (for example, about 15 V) required for movement (migration) of electrophoretic particles needs to be supplied between the electrodes that sandwiches the electrophoretic particles. Then, for example, when different colors, for example, a white color and a black color are displayed in adjacent pixels, different electric potentials are applied to the pixel electrodes of the adjacent pixels. In such a case, when the pixel electrodes are connected through the above-described adhesive agent layer having weak conductivity, a leakage current is generated between the adjacent pixel electrodes due to the electric potential difference between the pixel electrodes.

The leakage current generated as described above has a small amount per one spot. However, when the leakage currents are generated in a plurality of spots, the total leakage currents consume large power. For example, when there are many spots in which different colors are displayed in adjacent pixels, as described above, that is, when complicated display is performed, the power consumption increases, and thereby driving at low power consumption, which is one of the advantages of the electrophoretic display device, cannot be performed.

In addition, when a leakage current is generated, electric fields that are generated in edge portions and peripheries of the electrodes are changed. Accordingly, the electrophoretic particles cannot be easily migrated based on the design thereof, and defective display such as display of a gray color that is in the middle of a black color and a white color can easily occur. Therefore, the display quality is degraded.

In addition, the pixel electrode may incur a chemical reaction due to generation of the leakage current. Accordingly, when used for a long time, the pixel electrode deteriorates, and accordingly, display cannot be performed well. Furthermore, the reliability of the electrophoretic display device may be lowered.

SUMMARY

An advantage of some aspects of the invention is that it provides an electrophoretic display device capable of implementing low-power consumed driving by suppressing a leakage current between pixels and improving reliability. In addition, it also provides an electronic apparatus having the above-described electrophoretic display device.

According to a first aspect of the invention, there is provided an electrophoretic display device including: a first having a pixel electrode and another pixel electrode that is adjacent to the pixel electrode; a second substrate having a common electrode, the common electrode facing the pixel electrode and the another pixel electrode; electrophoretic elements disposed between the first substrate and the second substrate, the electrophoretic elements having charged electrophoretic particles; an adhesive agent layer disposed between the electrophoretic elements and the first substrate; and a floating electrode disposed between the pixel electrode and the another pixel electrode on the first substrate, the floating electrode being electrically isolated.

As a result of deliberations for solving the above-described problems, the inventors of the invention found that a leakage current is decreased so as to suppress an increase in the power consumption by disposing a floating electrode that is isolated electrically in an area between the pixel electrodes. Here, "isolated electrically" indicates that the floating electrode is formed in a state being not connected to any conduction member such as a peripheral wiring or electrode. This conduction member does not include the adhesive agent layer having weak conductivity.

According to the above-described electrophoretic display device, the electric field that extends from the pixel electrode at the time of applying a voltage arrives at the floating electrode disposed between the pixel electrodes at once and then extends from the floating electrode again. Then, compared to a case where the floating electrode is not disposed, an increase of the electric field to the common electrode side is prioritized, and accordingly, the electric field between the pixel electrodes decreases. Since the electric field that causes flow of electrons between the pixel electrodes decreases, generation of the leakage current between the pixel electrodes is suppressed, and thereby an electrophoretic display device implementing low power consumption can be configured.

In the above-described electrophoretic display device, it is preferable that the floating electrode is disposed along one side of the pixel electrode and extends along an extended line of the one side.

In such a case, for example, compared to a case where the floating electrode is disposed along one side of the pixel electrode, generation of the leakage current between adjacent pixels can be suppressed more assuredly. In particular, generation of a leakage current between adjacent pixel electrodes that are disposed on an extended line of a diagonal line of the pixel electrodes can be suppressed further.

In the above-described electrophoretic display device, it is preferable that the floating electrode is disposed to extend to a floating electrode that is disposed along one side of the another pixel electrode, which is adjacent to the pixel electrode, on the extended line of the one side.

In such a case, generation of the leakage current is suppressed more assuredly. In addition, in a case where the width of the intermediate electric potential electrode needs to be narrowed such as a case where a miniaturized electrophoretic display device is to be formed or a case where the pixel electrode is formed to be large, the intermediate electric potential electrode can be formed to have a sufficient area.

In the above-described electrophoretic display device, it is preferable that the floating electrode is disposed so as to enclose the periphery of the pixel electrode.

In such a case, generation of the leakage current can be suppressed more assuredly. In addition, the electric potential of the floating electrode can be stabilized at an intermediate electric potential between two pixels positioned on both sides of the floating electrode. Furthermore, the influence of capacitive combination of various driving elements, various wirings, and the like that are disposed on a lower layer of the floating electrode can be distributed.

In the above-described electrophoretic display device, it is preferable that the pixel electrode and the floating electrode are formed of a same material.

In such a case, the pixel electrode and the floating electrode can be formed separately by performing delicate processing for a thin film of a same formation material. Accordingly, even when high definition is implemented in the device, the floating electrode can be formed well, and thereby an electrophoretic display device implementing low power consumption can be configured.

In the above-described electrophoretic display device, it is preferable that an insulation layer that is formed of a material having electrical resistance higher than that of the adhesive agent layer is disposed between the pixel electrode and the floating electrode that is adjacent to the pixel electrode.

In such a case, since the insulation layer that is formed between the pixel electrodes blocks the leakage current flowing along the electric field, an electrophoretic display device that suppresses generation of the leakage current between the pixel electrodes further can be configured.

In the above-described electrophoretic display device, it is preferable that the insulation layer is disposed so as to cover the floating electrode and protrudes to the electrophoretic element side relative to an upper face of the pixel electrode.

In such a case, the path of the leakage current is lengthened, and thereby the leakage current does not flow easily.

According to a second aspect of the invention, there is provided an electronic apparatus having the above-described electrophoretic display device.

According to the above-described electronic apparatus, an electronic apparatus that suppresses generation of the leakage current between pixels so as to implement low power consumption and improves the reliability thereof can be configured.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an electrophoretic display device according to a first embodiment of the invention will be described with reference to FIGS. 1A to 5C. In all the drawings described below, for easy understanding of the drawings, the scales of the film thicknesses and dimensions of constituent elements are differently set appropriately.

Figure 1A:
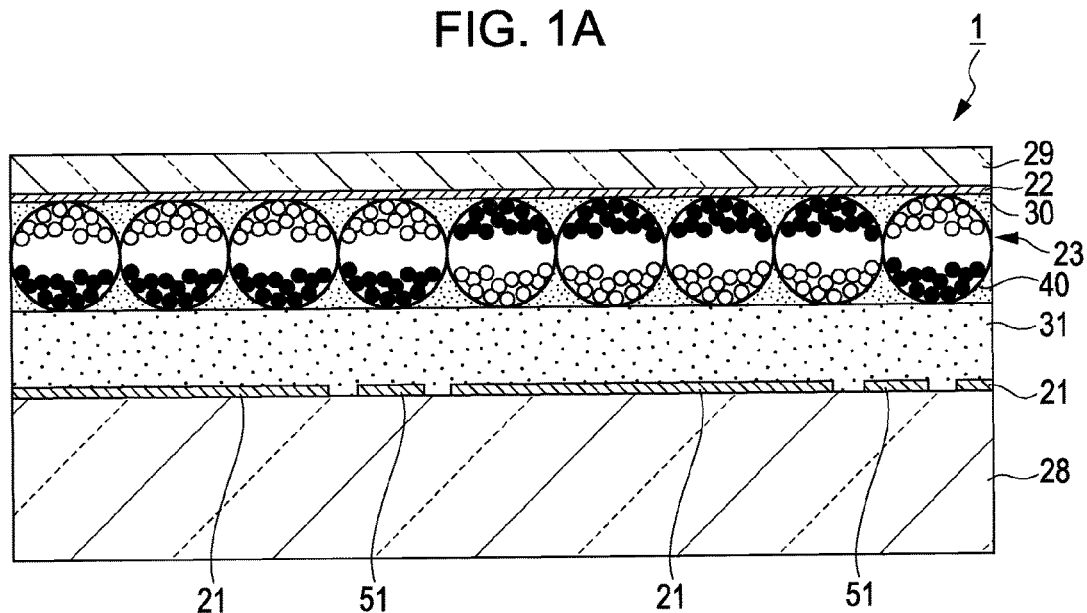
FIGS. 1A and 1B are explanatory diagrams of an electrophoretic display device according to a first embodiment of the invention.
Figure 1B:
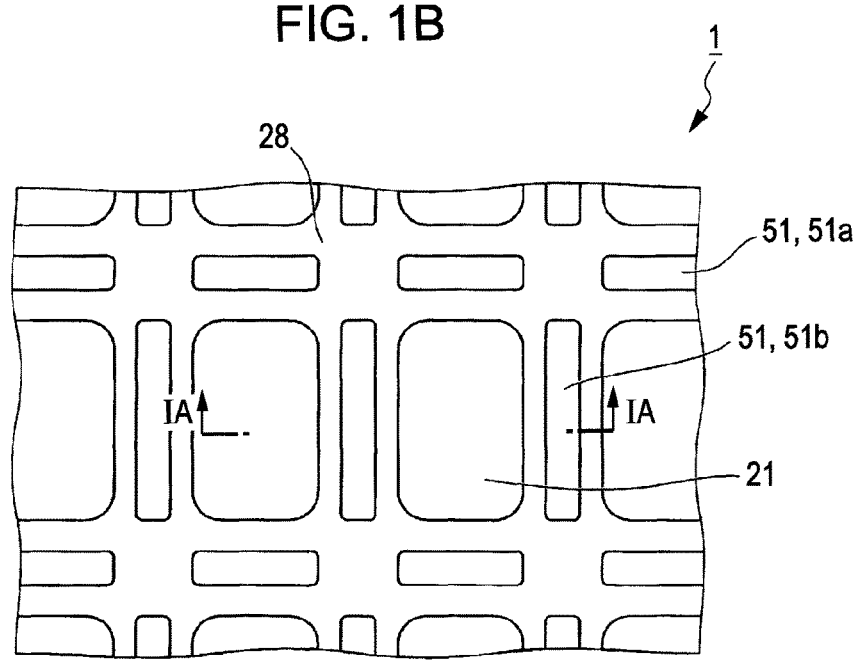

FIGS. 1A and 1B are explanatory diagrams of an electrophoretic display device 1 according to this embodiment. FIG. 1A is a cross-section view of the electrophoretic display device 1, and FIG. 1B is a plan view of the electrophoretic display device 1. FIG. 1A is a cross-section view taken along line IA-IA shown in FIG. 1B.

As shown in FIG. 1A, the electrophoretic display device 1 according to this embodiment includes a component substrate (first substrate) 28 that has a plurality of pixel electrodes 21, an opposing substrate (second substrate) 29 that has a common electrode 22, and an electrophoretic element layer 23 that is sandwiched by both the substrates. The electrophoretic element layer 23 is configured by a plurality of microcapsules 40. The electrophoretic element layer 23 is fixed on the common electrode 22 by a binder layer 30 that is formed of a binder (adhesive agent). In addition, between the component substrate 28 and the opposing substrate 29, an adhesive agent layer 31 is formed. The adhesive agent layer 31 sandwiches the electrophoretic element layer 23 and fixes both the substrates 28 and 29. In addition, among the pixel electrodes 21 on the component substrate 28, a plurality of intermediate electric potential electrode (floating electrode) 51 is formed.

In the electrophoretic display device 1 according to this embodiment, an area that is formed by overlapping one pixel electrode 21, the electrophoretic element layer 23, and the common electrode 22 two-dimensionally configures one pixel, and a display image that is displayed by a plurality of pixels is displayed on the opposing substrate 29 side. In addition, in the electrophoretic display device 1, additional drive circuits and other auxiliary devices are installed that are not shown in FIG. 1A.

The component substrate 28 is acquired by preparing a rectangle-shaped substrate that is formed of synthetic resin or glass, forming various driving elements such as driving TFTs and latch circuits, which are not shown in the figure, and various wirings on the substrate, and forming a flattening layer (not shown) formed of acrylic resin thereon additionally. On the flattening layer that is flattened as described above, pixel electrodes 21 that are connected to the driving TFTs and the latch circuits are formed.

The pixel electrodes 21 are disposed independently for each pixel and are formed in a matrix shape by using Al (aluminum), copper (Cu), AlCu, or the like. In this embodiment, the pixel electrodes 21 are formed of AlCu that has superior conductivity and high corrosion resistance.

In an area between the pixel electrodes 21, the intermediate electric potential electrode 51 is formed. The intermediate electric potential electrode 51 is not connected to the pixel electrode 21 that is formed in a same layer and is not connected to any wiring or electrode of other layers. In other words, the intermediate electric potential layer 51 is formed in an electrically isolated state. The intermediate electric potential electrode 51 according to this embodiment is formed of a material that is the same as that of the pixel electrode 21. For example, the intermediate electric potential electrode 51 can be formed simultaneously with the pixel electrode 21 by forming an AlCu film on the entire surface of the component substrate 28 and patterning the AlCu film by using a known method. The formation material of the intermediate electric potential electrode 51 may be different from that of the pixel electrode 21. The function of the intermediate electric potential electrode 51 will be described later in detail.

The opposing substrate 29, as described above, is a substrate located on a side on which an image is displayed. The opposing substrate 29 has a rectangular shape formed of a transparent material such as transparent resin or glass. On a face of the opposing substrate 29 that faces the component substrate 28, the common electrode 22 that faces all the pixel electrodes 21 is disposed. The common electrode 22 is formed of a conductive material having translucency. For example, the common electrode 22 is formed of ITO (indium tin oxide), IZO (registered trademark, indium zinc oxide), MgAg (magnesium silver), or the like.

On a face of the common electrode 22 that faces the component substrate 28, the electrophoretic element layer 23 is formed. The electrophoretic element layer 23 has a plurality of the microcapsules (electrophoretic elements) 40 and a binder layer 30 that is disposed to fill out gaps of the microcapsules 40. The electrophoretic element layer 23 is fixed on the common electrode 22 by the binder layer 30. A plurality of the microcapsules 40 that configures the electrophoretic element layer 23 is arranged so as to be two-dimensionally overlapped with one another for one pixel electrode 21.

The microcapsule 40 is formed of acrylic resin such as polymethylmethacrylate or polyethylmethacrylate or a transparent high molecular resin such as urea resin or Arabic rubber. The microcapsule 40 encloses dispersion liquid to be described later. For example, the microcapsule 40 is formed to have a particle diameter of about 50 μm.

Between the electrophoretic element layer 23 and the pixel electrode 21 of the component substrate 28, the adhesive agent layer 31 is disposed. The adhesive agent layer 31 sandwiches the electrophoretic element layer 23 so as to fix both the substrates 28 and 29. The adhesive agent layer 31 has weak conductivity due to foreign substances that are included in the used adhesive agent.

FIG. 1B is a schematic plan view of the electrophoretic display device 1 and shows a disposition of the pixel electrodes 21 and the intermediate electric potential electrodes 51 that are disposed on the component substrate 28.

The pixel electrode 21 takes on an approximately rectangular shape in the plan view. A plurality of the pixel electrodes 21 is arranged in a matrix shape with the long axes thereof aligned in a same direction. Between short sides of adjacent pixel electrodes 21 that face each other, an intermediate electric potential electrode 51a having a length that is approximately the same as that of the short side of the pixel electrode 21 is disposed. In addition, between the long sides of the adjacent pixel electrodes 21 that face each other, an intermediate electric potential electrode 51b having a length that is approximately the same as that of the long side of the pixel electrode 21 is disposed. The intermediate electric potential electrode 51 is disposed in each area between the pixel electrodes 21. The electrophoretic display device 1 according to this embodiment is configured as described above.

Next, after the structure of the microcapsule 40 that is included in the electrophoretic element layer 23 is described with reference to FIGS. 2 and 3, the operation of the electrophoretic display device 1 will be described.

Figure 2:
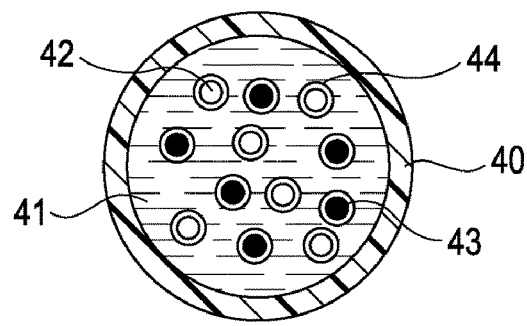
FIG. 2 is a schematic cross-section view showing the internal structure of an electrophoretic element according to the first embodiment.

FIG. 2 is a schematic cross-section view showing the internal structure of the microcapsule 40. As shown in the figure, inside the microcapsule 40, a dispersion medium 41, a plurality of white particles (electrophoretic particles) 42 and a plurality of black particles (electrophoretic particles) 43 that are electrophoretic particles are enclosed.

The dispersion medium 41 is liquid that disperses the white particles 42 and the black particles 43 inside the microcapsule 40. As the dispersion medium 41, water, an alcohol-based solvent, various esters, ketones, aliphatic hydrocarbon, cycloaliphatic hydrocarbon, aromatic hydrocarbon, halogenated hydrocarbon, carboxylate, or other kinds of oils or a mixture of the above-described materials to which surfactant or the like is added may be used.

The white particles 42 are particles (polymer particles or colloids) made of a white pigment such as titanium dioxide, zinc flower, or antimony trioxide and, for example, are negatively charged. The black particles 43 are particles (polymer particles or colloids) made of a black pigment such as aniline black or carbon black and, for example, are positively charged.

A charge control agent containing particles of an electrolyte, a surfactant, metal soap, resin, rubber, oil, varnish, compound, or the like; a dispersant such as a titanium-based coupling agent, an aluminum-based coupling agent, or a silane-based coupling agent; a lubricant; a stabilizing agent; or the like may be added to the above-described pigment, as needed. In addition, the specific gravity of these electrophoretic particles (the white particles 42 and the black particles 43) is set to be almost the same as that of the dispersion medium 41 that disperses the electrophoretic elements.

On each surface of the white particles 42 and the black particles 43, an ion layer (electrical dual layer) 44 is formed so as to electrically protect the particles. Accordingly, the particles are dispersed in the dispersion medium 41 with being electrostatically repulsed, without being aggregated. The dispersion liquid formed of the dispersion medium 41, the white particles 42, and the black particles 43 becomes colloid solution that is stable as a whole.

FIG. 3 is a diagram for describing the operation of the electrophoretic particles inside the microcapsule 40. In FIG. 3, ion layers 44 of the particles are omitted. The white particles 42 and the black particles 43 inside the microcapsule 40, as described above, are electrically charged negatively or positively. Accordingly, in the dispersion medium 41, the white particles 42 and the black particles 43 move (migrate) within an electric field that is generated by an electric potential difference between the pixel electrode 21 and the common electrode 22.

Figure 3A:
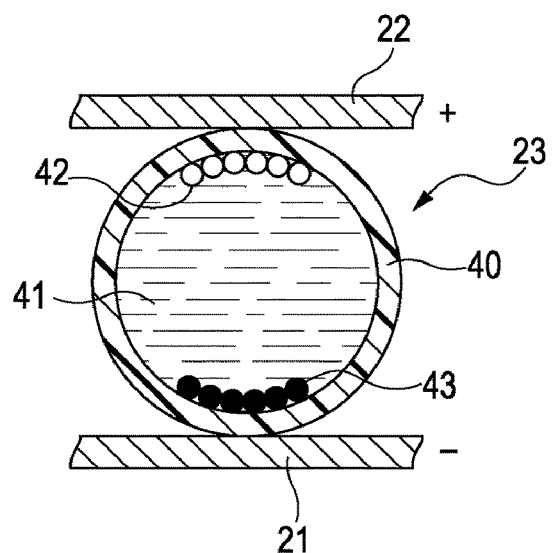
FIG. 3 is an explanatory diagram for describing the operation of electrophoretic particles inside the electrophoretic element.

As shown in FIG. 3A, when a voltage is applied such that the electric potential of the pixel electrode 21, between the pixel electrode 21 and the common electrode 22, is relatively low (low level), an electric field is generated in a direction from the common electrode 22 to the pixel electrode 21. At this moment, the black particles 43 that are positively charged receive a coulomb force in the electric field direction (the direction from the common electrode 22 to the pixel electrode 21) so as to migrate to the pixel electrode side 21 within the microcapsule 40. On the other hand, the white particles 42 that are negatively charged receive a coulomb force in a direction (the direction from the pixel electrode 21 to the common electrode 22) opposite to the electric field direction so as to migrate to the common electrode 22 side within the microcapsule 40. As a result, on the display surface side (the opposing substrate 29 side) within the microcapsule 40, the white particles 42 are aggregated, and thereby the color of these white particles 42 (white color) is displayed on the display surface.

Figure 3B:
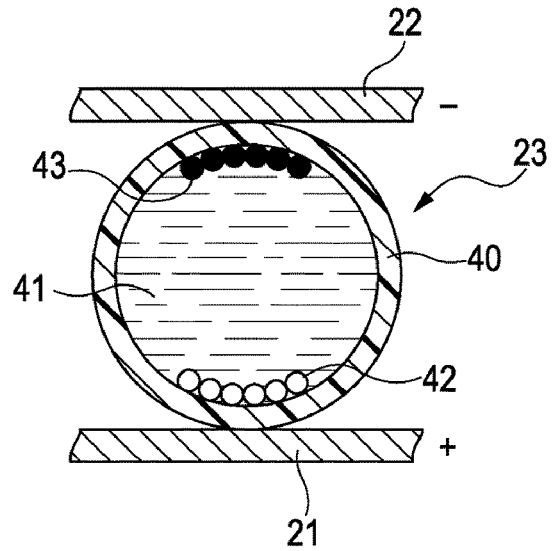

On the other hand, as shown in FIG. 3B, when a voltage is applied such that the electric potential of the pixel electrode 21, between the pixel electrode 21 and the common electrode 22, is relatively high (high level), an electric field is generated in a direction from the pixel electrode 21 to the common electrode 22. Then, similarly, the white particles 42 that are negatively charged migrate to the pixel electrode side 21, and the black particles 43 that are negatively charged migrate to the common electrode 22 side. As a result, on the display surface side of the microcapsule 40, the black particles 43 are aggregated, and thereby the color of these black particles 43 (black color) is displayed on the display surface.

In addition, by using a red pigment such as quinacridone red, a blue pigment such as phthalocyanine blue, a green pigment such as phthalocyanine green, or the like as the pigment used for the white particles 42 or the black particles 43, the electrophoretic display device 1 that displays a red color, a green color, a blue color, and the like can be implemented.

In a general electrophoretic display device, when the above-described operation is performed, a leakage current may be generated between adjacent pixels electrodes, and whereby power consumption is increased. In other words, when display in which a white color and a black color are adjacently represented is performed by applying a high-level electric potential to one of two adjacent pixel electrodes 21 and applying a low-level electric potential to the other, a current is generated between the pixel electrodes due to an electric potential difference between the adjacent pixel electrodes. Such a leakage current increases when high-definition display in which the white color and the black color are complicatedly disposed is performed, and whereby the power consumption is increased.

Thus, in the electrophoretic display device according to an embodiment of the invention, as shown in FIG. 1, by disposing the intermediate electric potential electrode 51 in an area between the pixel electrodes 21, the above-described problems are solved. As a result of various deliberations, the inventor of the invention found that the leakage current is decreased so as to suppress an increase in the power consumption by disposing the intermediate electric potential electrode 51 in the area between the pixel electrodes 21. By disposing the intermediate electric potential electrode 51 between the pixel electrodes, the propagation pattern of an electric field that is generated between the pixel electrodes is through to be changed, whereby generation of the leakage current is suppressed.

Figure 4A:
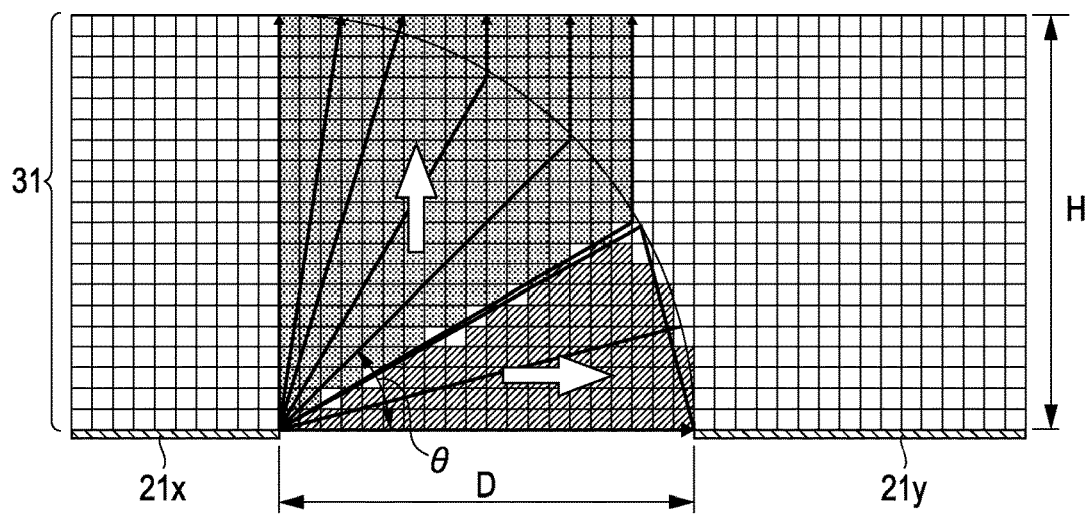
FIGS. 4A and 4B are results of simulation of the function of an intermediate electric potential electrode according to the first embodiment.
Figure 4B:
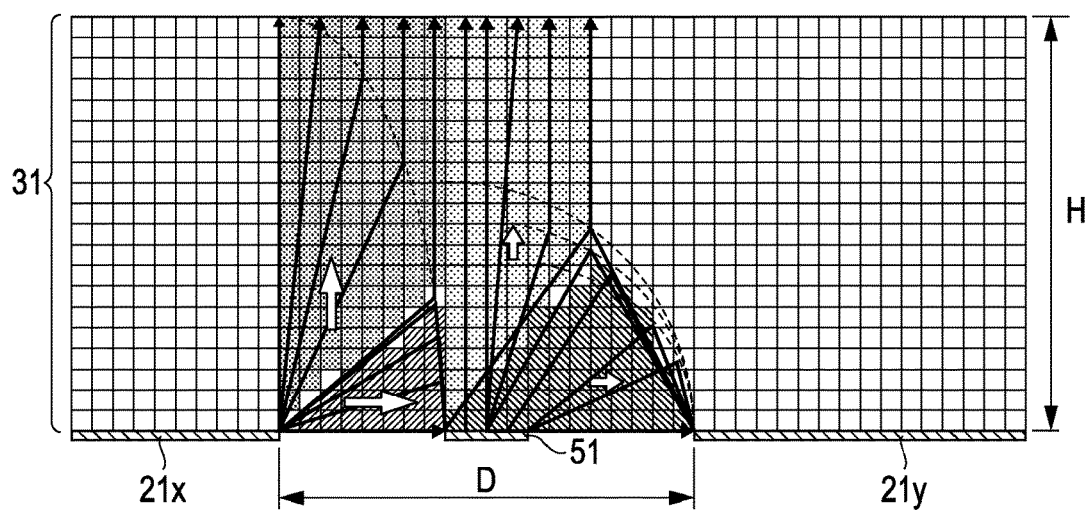

In order to verify the above-described thought, a difference between the electric fields generated between the pixel electrodes for cases of existence and non-existence of the intermediate electric potential electrode 51 is acquired by simulation. FIGS. 4A and 4B are results of simulation of the function of the intermediate electric potential electrode. FIG. 4A shows the magnitude and the propagation pattern of an electric field that is generated between adjacent pixel electrodes for a case where the intermediate electric potential electrode is not disposed. FIG. 4B shows the magnitude and the propagation pattern of an electric field that is generated between the adjacent pixels for a case where the intermediate electric potential electrode is disposed.

Here, by using a model in which a distance D between a pixel electrode 21x and a pixel electrode 21y and the thickness H of the adhesive agent layer 31 are the same as 20 μm calculation for a case where an electric potential of a high level relative to that of the common electrode not shown in the figure is applied to the pixel electrode 21x, and an electric potential of a low level is applied to the pixel electrode 21y is performed. In addition, as the intermediate electric potential electrode 51 shown in FIG. 4B, a model in which the intermediate electric potential electrode 51 is formed to have a width of 4 μm with a center point between the pixel electrode 21x and the pixel electrode 21y used as it center is used.

In FIGS. 4A and 4B, white arrows denoting the vertical direction and the horizontal direction are disposed so as to represent an area in which an electric field of the electric fields (lines of electric force), which are generated from the pixel electrode 21x, that arrives at the common electrode extends and an area in which an electric field that arrives at the pixel electrode 22y or the intermediate electric potential electrode extends. The size of a white arrow represents the intensity of the electric field of an area in which the arrow is disposed.

As shown in FIG. 4A, for a case where the intermediate electric potential electrode is not disposed, a part of the electric field (lines of electric force) from an end portion of the pixel electrode 21x extends toward the common electrode, and the remaining part of the electric field extends toward the pixel electrode 21y. The electric field that extends to the pixel electrode 21y causes the leakage current flowing from the pixel electrode 21x to the pixel electrode 21y.

On the other hand, as shown in FIG. 4B, for a case where the intermediate electric potential electrode 51 is disposed at the center point between the pixel electrode 21x and the pixel electrode 21y, a part of the electric field from the pixel electrode 21x that extends in the horizontal direction arrives at the intermediate electric potential electrode 51 once. Then, the electric field extends again from the intermediate electrode potential electrode 51 based on a difference between the electric potential of the intermediate electric potential electrode 51 and the electric potential of the common electrode or the pixel electrode 21y. At that moment, a part of the electric field that extends from the intermediate electric potential electrode 51 extends toward the common electrode again, and accordingly, only the remaining electric field extends to the pixel electrode 21y. Accordingly, by disposing the intermediate electric potential electrode 51, the electric field that extends from the pixel electrode 21x extends easily toward the common electrode and does not extend easily toward the pixel electrode 21y. As a result, the intensity of the electric field that extends to the pixel electrode 21y is decreased.

In addition, in the electrophoretic display device 1 according to this embodiment, a phenomenon indicating that the state of nonlinear connection, which is not ohmic contact perfectly following the Ohm's law, is formed between the intermediate electric potential electrode 51 and the adhesive agent layer 31 was observed. Accordingly, effective resistance between the intermediate electric potential electrode 51 and the adhesive agent layer 31 increases, and accordingly, a situation in which a current cannot easily flow occurs.

Based on the simulation result shown in FIGS. 4A and 4B, by disposing the intermediate electric potential electrode 51, the intensity of the electric field that extends from the pixel electrode 21x to the pixel electrode 21y is decreased, and accordingly, a current cannot flow easily between the pixel electrodes. In addition, the effective resistance of the boundary face of the intermediate electric potential electrode 51 and the adhesive agent layer 31 is increased, and accordingly, the current cannot flow easily, as well. According to such complicated factors, the generation of the leakage current between the pixel electrodes is suppressed.

Here, one of the aspects is that the intermediate electric potential electrode 51 is electrically isolated. Even when the intermediate electric potential electrode 51 is connected to a wiring, for example, GND, the display quality can be maintained by not allowing the leakage current to flow between the pixel electrodes. However, in such a case, a leakage current is generated between the pixel electrode and the intermediate electric potential electrode, and thereby power is consumed. Accordingly, low power consumption that is an advantage of the electrophoretic display device according to an embodiment of the invention cannot be implemented.

On the other hand, the intermediate electric potential according to an embodiment of the invention is electrically isolated. Thus, although the pixel electrodes 21 are charged electrically, any current does not flow, and accordingly, power consumption is not increased. When the electric potentials of the adjacent pixel electrodes 21 are in a same state (same display state), the electric charges that are generated in the intermediate electric potential electrode 51 are neutralized and diffuse through the adhesive agent layer 31 so as to disappear.

Here, a case where the leakage current flowing from the pixel electrode 21x to the pixel electrode 21y is suppressed is described. However, even when the electric potentials applied to the pixel electrodes are changed and the electric potential of the pixel electrode 21y is higher than that of the pixel electrode 21x, similarly, generation of a leakage current flowing from the pixel electrode 21y to the pixel electrode 21x can be suppressed.

As described above, in the electrophoretic display device 1 according to this embodiment, by disposing the intermediate electric potential electrode 51 that is electrically isolated, generation of the leakage current is suppressed, and thereby low power consumption is implemented. In addition, the display quality is maintained, and thereby reliability of the device can be improved.

According to the electrophoretic display device 1 of the above-described configuration, the intermediate electric potential electrode 51 is disposed in an area between the pixel electrodes 21. Accordingly, an increase of the electric field of the common electrode 22 side is prioritized, and the electric field between the pixel electrodes 21 decreases. Thus, the electric field that generates flow of electrons between the pixel electrodes 21 decreases. Accordingly, generation of the leakage current between the pixel electrodes 21 is suppressed, and thereby the electrophoretic display device 1 that realizes low power consumption can be implemented.

In addition, according to this embodiment, all the pixel electrodes 21 and the intermediate electric potential electrodes 51 are formed of a same formation material of AlCu. Accordingly, the pixel electrodes 21 and the intermediate electric potential electrodes 51 can be formed simultaneously by performing delicate patterning for a thin film of a formation material that is formed to be uniform. For example, even when high definition of the device is implemented, the intermediate electrical potential electrodes can be formed well. Accordingly, the electrophoretic display device that realizes low power consumption can be implemented.

MODIFIED EXAMPLES

Figure 5A:
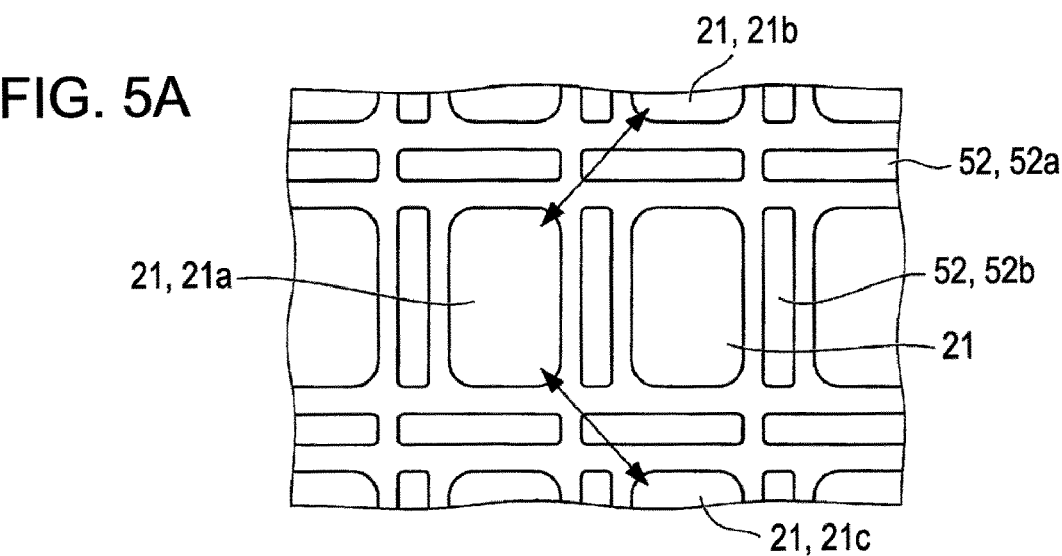
FIGS. 5A to 5C are plan views of modified examples of the first embodiment.
Figure 5B:
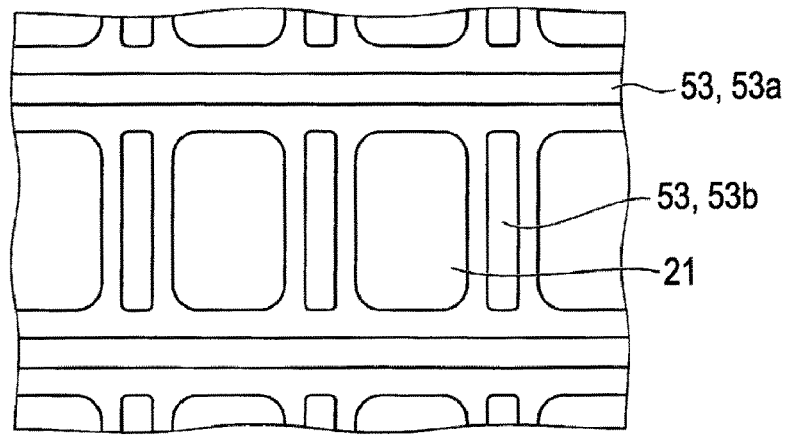
Figure 5C:
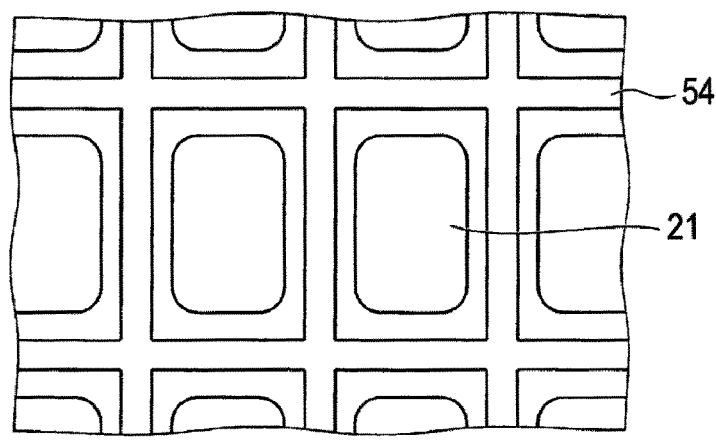

Based on the purpose of the invention of suppressing the leakage current by disposing the intermediate electric potential electrode between adjacent pixel electrodes so as to change the propagation pattern of the electric field (lines of electric force), it is apparent that the shape or the disposition of the intermediate electric potential electrode can be changed. Hereinafter, the shape and the disposition of the intermediate electric potential electrode according to several modified examples will be described. FIGS. 5A to 5C are plan views of the modified examples and are diagrams corresponding to FIG. 1B.

In FIG. 5A, the intermediate electric potential electrodes 52a extend up to intersections of pixel electrodes 21 that are disposed vertically and horizontally in a lattice shape in the plan view. In other words, the intermediate electric potential electrode 52a that is disposed along the short side of the pixel electrode 21 extends along an extended line of the short side of the pixel electrode 21. Accordingly, even in an area between, for example, pixel electrodes 21b and 21c that are adjacent to the pixel electrode 21a in the inclining direction (directions of both arrows shown in FIG. 5A), the intermediate electric potential electrode 52a is disposed. By including the intermediate electric potential electrodes 52 of such a disposition, it is possible to suppress a leakage current flowing between pixel electrodes 21 that are adjacent to each other not only in the vertical and horizontal directions but also in the inclining direction. Here, the intermediate electric potential electrode 52a disposed along the short side of the pixel electrode 21 extends up to the intersection of the areas between the pixel electrodes. However, the intermediate electric potential electrode 52b that is disposed so as to follow the long side of the pixel electrode 21 may extend up to the intersection of the areas.

In FIG. 5B, intermediate electric potential electrodes 53a that are disposed along the short sides of a plurality of adjacent pixel electrodes 21 extend so as to be formed integrally without any discontinuation. In other words, the intermediate electric potential electrode 53a is disposed along the short side of the pixel electrode 21 and is disposed so as to extend up to an intermediate electric potential electrode disposed along the short side of a pixel electrode next to the pixel electrode 21. Under such a configuration, the leakage current between pixel electrodes 21 that are adjacent in the vertical direction can be prevented efficiently. In addition, in a case where the width of the intermediate electric potential electrode 53 needs to be narrowed such as a case where a miniaturized electrophoretic display device is to be formed or a case where the pixel electrode 21 is formed to be large, the intermediate electric potential electrode 53 can be appropriately formed widely. In addition, similar to FIG. 5A, the intermediate electric potential electrodes 53b that are formed along the long sides of the pixel electrodes 21 may extend in an integrated form without any discontinuation so as to be adjacent to the long sides of a plurality of the pixel electrodes 21.

In FIG. 5C, the intermediate electric potential electrode 54 is formed in a lattice shape so as to enclose a plurality of pixel electrodes 21. In other words, the intermediate electric potential electrode 54 is disposed so as to surround the peripheries of the pixel electrodes 21. Here, one lattice formed by the intermediate electric potential electrode 54 encloses one pixel electrode 21. In such a configuration, generation of leakage currents between pixel electrodes 21 that are adjacent in any direction can be prevented efficiently. In addition, the electric potential of the intermediate electric potential electrode 54 can be stabilized at an intermediate electric potential between two pixels positioned on both sides of the intermediate electric potential electrode 54. In addition, the influence of capacitive combination of various driving elements, various wirings, and the like, not shown in the figure, that are disposed on a lower layer of the floating electrode can be distributed.

The electrophoretic display device including the intermediate electric potential electrode 51 having the shape represented in the modified examples can perform high-quality display by suppressing generation of the leakage current so as to suppress power consumption, in the same manner. Among the above-described modified examples, for example, in the dispositional relationship for wirings such as the data lines, the scanning lines, and the like that are formed in a different layer, a disposition in which the influence due to capacitive combination with the wirings is minimized can be selected.

Second Embodiment

Figure 6A:
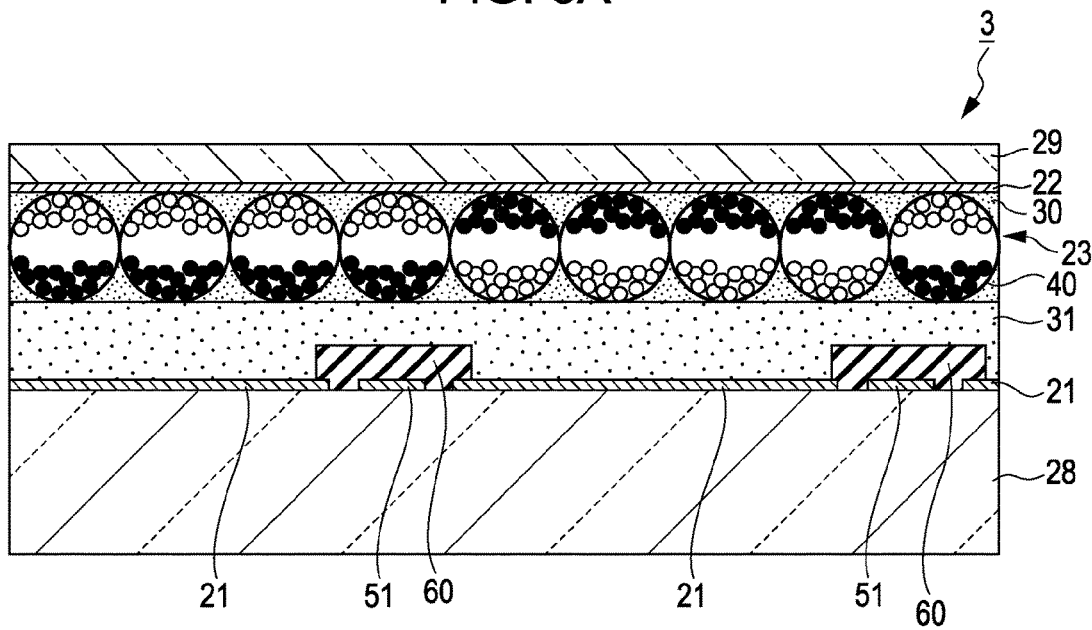
FIGS. 6A and 6B are explanatory diagrams of an electrophoretic display device according to a second embodiment of the invention.
Figure 6B:
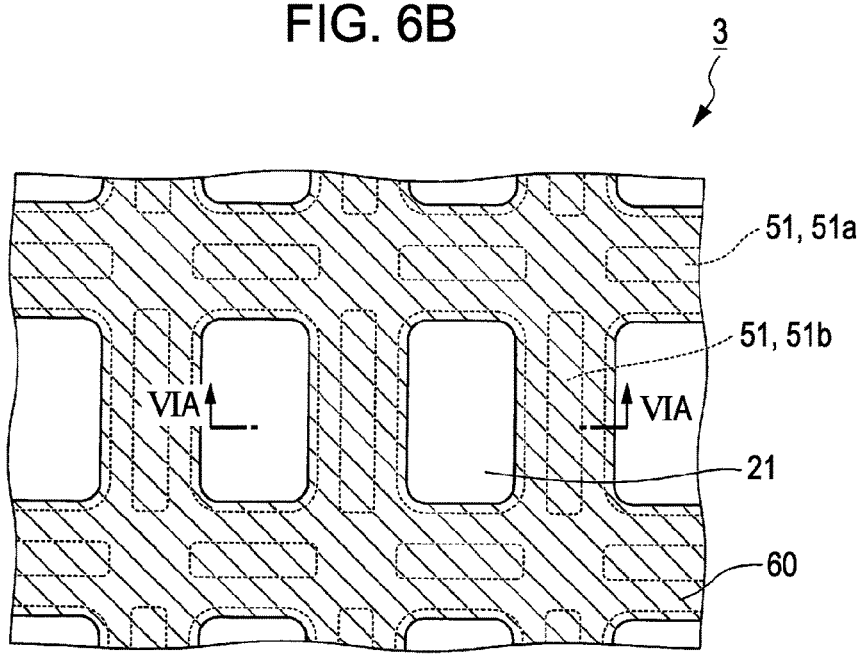

FIGS. 6A and 6B are explanatory diagrams of an electrophoretic display device according to a second embodiment of the invention. FIG. 6A is a cross-section view of the electrophoretic display device, and FIG. 6B is a plan view of electrophoretic display device. FIG. 6A shows a cross-section view taken along line VIA-VIA shown in FIG. 6B.

The electrophoretic display device according to this embodiment is common to a part of that according to the first embodiment. A difference between the first embodiment and the second embodiment is that an insulation layer 60 that covers the intermediate electric potential electrodes 51 and protrudes to the electrophoretic element layer 23 side relative to upper faces of the pixel electrodes 21 is formed in the second embodiment. Thus, to each constituent element of the second embodiment that is common to the first embodiment, a same reference sign is assigned, and a detailed description thereof is omitted here.

As shown in FIG. 6A, in an electrophoretic display device 3 of this embodiment, the insulation layer 60 that covers the intermediate electric potential electrodes 51 is formed. The insulation layer 60 is partly overlapped with a peripheral portion of adjacent pixel electrodes 21 and is formed so as to protrude to the electrophoretic element layer 23 side relative to the top face of the pixel electrode 21. In FIGS. 6A and 6B, the shape of the insulation layer 60 is represented in an approximately rectangular shape in the cross-section view. However, the shape of the insulation layer 60 is not limited thereto. Thus, it is preferable that a convex shape such as a half-circle form or a taper shape in the cross-section view is used.

The insulation layer 60 is formed of a material having conductivity relatively lower than the adhesive agent layer 31. For example, a resin film such as acrylic resin, epoxy resin, or polycarbonate or an inorganic film such as $SiO_2$, $Si_3N_4$, SiNx, SiON, or $Al_2O_3$ may be used. Such a resin film or inorganic film is formed so as not to include a foreign material that causes conduction. The insulation layer 60 is formed by forming a uniform thin film by using, for example, a CVD method, a deposition method, or a spin coat method and then, opening areas of the pixel electrodes 21 by using a patterning method such as a wet etching method.

As shown in FIG. 6B, the insulation layer 60 is formed so as to enclose the peripheries of the pixel electrodes 21 in a lattice shape. A part of the insulation layer 60 is formed on the pixel electrode 21 so as to frame the periphery of the pixel electrode 21 in a frame shape.

In the electrophoretic display device 3 including the insulation layer 60, the insulation layer 60 blocks a leakage current flowing along an electric field, in addition to the effect of the intermediate electric potential electrode 51. Accordingly, generation of the leakage current can be suppressed further.

In addition, the insulation layer 60 has conductivity that is lower than that of the adhesive agent layer 31 (high electrical resistance), and accordingly, the leakage current goes around the insulation layer 60 and flows inside the adhesive agent layer 31. According to the electrophoretic display device 3 of this embodiment, the insulation layer 60 is formed so as to protrude to the electrophoretic element layer 23 side relative to the upper face of the pixel electrode 21. Accordingly, a leakage path that goes around the insulation layer 60 is lengthened. As a result, generation of the leakage current between the pixel electrodes 21 can be suppressed further. Therefore, the electrophoretic display device 3 having lower power consumption can be implemented.

In the electrophoretic display device 3, the insulation layer 60 is formed so as to cover the intermediate electric potential electrodes 51. However, the insulation layer 60 may be formed so as not to cover the intermediate electric potential electrodes 51. Even in a case where the intermediate electric potential electrodes 51 are not covered, the insulation layer 60 is disposed between the pixel electrode 21 and the intermediate electric potential electrode 51, and accordingly, a path connecting end portions of the pixel electrode 21 and the intermediate electric potential electrode 51 is blocked by the insulation layer 60. The path connecting the end portions of both the electrodes is a path having the shortest length through which a leakage current can flow most easily. By blocking this leakage path by using the insulation layer 60, a function of the insulation layer 60 that makes it difficult for a leakage current to flow can be exhibited.

Electronic Apparatus

Figure 7:
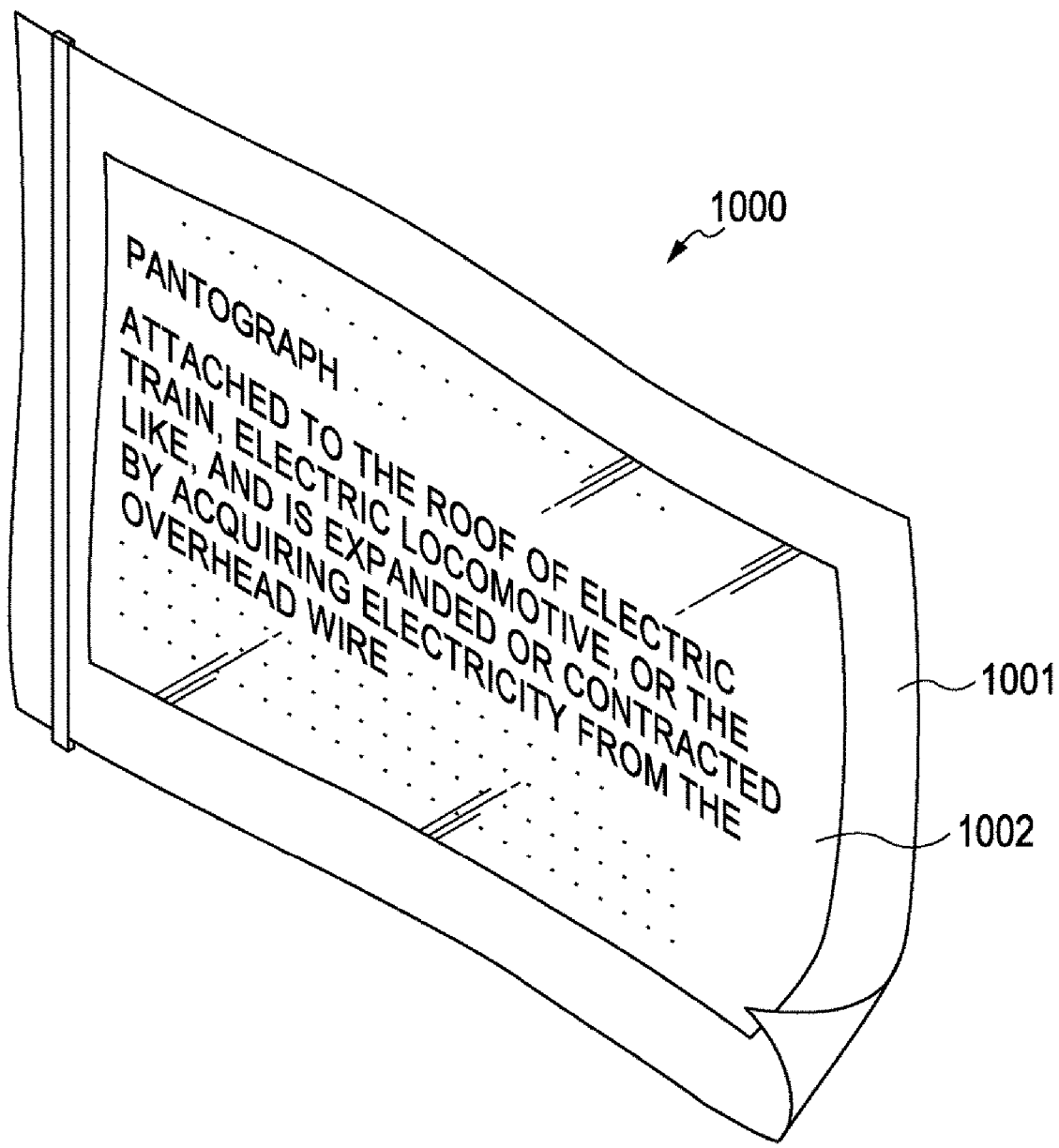
FIG. 7 is a perspective view showing an example of an electronic apparatus according to an embodiment of the embodiment.

Next, an electronic apparatus according to an embodiment of the invention will be described. FIG. 7 is a perspective view showing an example of an electronic apparatus according to an embodiment of the invention. Here, an embodiment in which the electrophoretic display device according to an embodiment of the invention is applied to an electronic paper sheet is represented. The electronic paper sheet 1000 includes a main body 1001 formed of a rewritable sheet that has texture and flexibility same as paper and a display unit 1002. In the electronic paper sheet 1000, the display unit 1002 is configured by the electrophoretic display device according to an embodiment of the invention. Accordingly, an electronic paper sheet 1000 that can suppress a leakage current in the display unit 1002 and has low power consumption can be implemented.

As above, the appropriate embodiments of the invention have been described with reference to the accompanying drawings. However, it is apparent the invention is not limited to the above-descried examples. All the shapes and combinations of the constituent members shown in the above-described examples are merely examples and may be changed in various forms based on the design requirement or the like without departing from the gist of the invention.

What is claimed is:

1. An electrophoretic display device comprising:
a first substrate,
a pixel electrode being disposed on the first substrate, another pixel electrode that is adjacent to the pixel electrode being disposed on the first substrate;
a second substrate,
a common electrode being disposed on the second substrate, the common electrode facing the pixel electrode and the another pixel electrode;
electrophoretic elements disposed between the first substrate and the second substrate, the electrophoretic elements having charged electrophoretic particles;
an adhesive agent layer disposed between the electrophoretic elements and the first substrate; and
a floating electrode disposed on the first substrate in the same layer as the pixel electrode and the another pixel electrode, the floating electrode being located between the pixel electrode and the another pixel electrode in plan view, the floating electrode being electrically isolated from the pixel electrode and the another pixel electrode.

2. The electrophoretic display device according to claim 1, wherein the floating electrode is disposed along one side of the pixel electrode and extends along an extended line of the one side.

3. The electrophoretic display device according to claim 1, wherein the floating electrode is disposed to extend to a floating electrode that is disposed along one side of the another pixel electrode, which is adjacent to the pixel electrode, on the extended line of the one side.

4. The electrophoretic display device according to claim 1, wherein the floating electrode is disposed so as to enclose the periphery of the pixel electrode.

5. The electrophoretic display device according to claim 1, wherein the pixel electrode and the floating electrode are formed of a same material.

6. The electrophoretic display device according to claim 1, wherein an insulation layer that is formed of a material having electrical resistance higher than that of the adhesive agent layer is disposed between the pixel electrode and the floating electrode that is adjacent to the pixel electrode.

7. The electrophoretic display device according to claim 6, wherein the insulation layer is disposed so as to cover the floating electrode and protrudes to the electrophoretic elements side relative to an upper face of the pixel electrode.

8. An electronic apparatus comprising the electrophoretic display device according to claim 1.

* * * * *